No. 856,055. PATENTED JUNE 4, 1907.
G. T. HAAN.
FLY TRAP.
APPLICATION FILED OCT. 8, 1906.
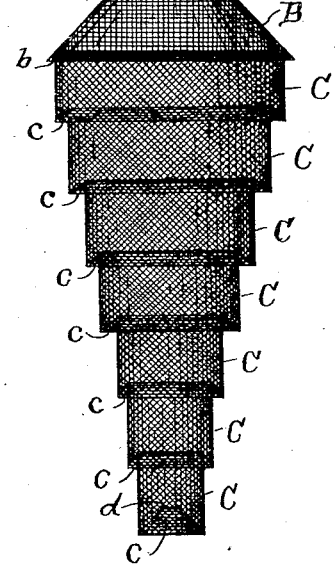
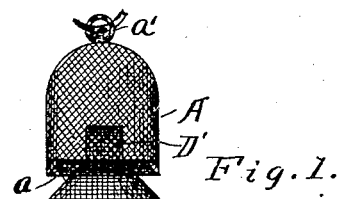
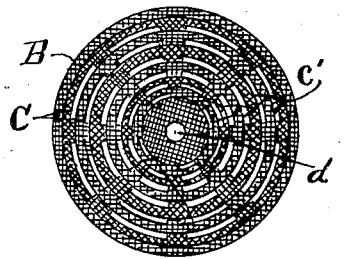
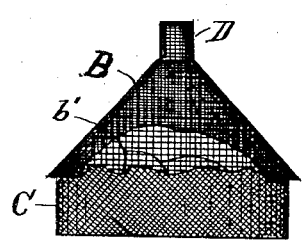
Witnesses
A. Allgier.
F. G. Friend
Inventor
Gilbert T. Haan
By Ithiel J. Cilley
Attorney

UNITED STATES PATENT OFFICE.

GILBERT T. HAAN, OF HOLLAND, MICHIGAN, ASSIGNOR OF ONE-HALF TO HENRY W. MELENBACKER, OF GRAND RAPIDS, MICHIGAN.

FLY-TRAP.

No. 856,055.      Specification of Letters Patent.      Patented June 4, 1907.

Application filed October 8, 1906. Serial No. 338,085.

*To all whom it may concern:*

Be it known that I, GILBERT T. HAAN, a citizen of the United States, residing at Holland, in the county of Ottawa and State of Michigan, have invented certain new and useful Improvements in Fly-Traps, of which the following is a specification.

My invention relates to improvements in fly traps for use in restaurants and other places where a large number of flies are likely to collect, and its objects are: First, to provide a convenient, sightly fly trap that may be hung up on the wall or ceiling without disfiguring a room; second, to provide a fly trap with which all the flies in a room are likely to be caught without the necessity of placing nauseating baits to attract them, and, third, to provide a fly trap with which the flies may be disposed of without the unsightly and disagreeable means necessary with traps of this kind now on the market. I attain these objects by the mechanism illustrated in the accompanying drawing in which Figure 1 is an elevation of the trap represented as being supported upon a hook, with all its parts in place; Figs. 2 and 3 are a top and a bottom plan, respectively, of the trap, and Fig. 4 is an elevation of the top section of the trap proper with a portion cut away to show openings between the side wall and the top for the entrance of flies that may alight upon the top section.

Similar letters refer to similar parts throughout the several views.

A represents the final receptacle for the flies. This portion constitutes the supporting portion of the trap, it being supported by placing the ring $a'$ over a hook, as indicated, so that the trap proper will hang suspended in the center of a room, or in any other position that may be desired. The base or bottom of this portion inclines upward, as indicated at $a$, and terminates in a tube or ferrule $D'$ of a proper diametrical size to receive and hold the open tube D on the section B sufficiently firm to avert the danger of the trap falling therefrom. Openings, corresponding with the openings $c'$ in Fig. 3, may be made in the base of the portion A, at $a$, so that any flies that will alight upon the portion B will be likely to pass therefrom into the portion A.

It is a well known inclination for flies, when alighting upon a vertical surface, to crawl or climb upward, and I have aimed to take advantage of this fact by making the trap in several sections in a vertical line, and to make each upper section somewhat larger than the next lower, as indicated at C, C, &c., and by making an upwardly inclined wall at $c$, $c$, &c., so that as the fly climbs upward upon any one of the sections he will approach this obstacle. It has been found that when a fly approaches an obstacle of this kind, in its upward progress, instead of dropping back downward it will endeavor to pass on beyond it, and for the purpose of allowing the fly to enter the trap at these points I provide a series of convenient openings, as $c'$, in each projection at $c$, $c$, &c., so that the fly may easily pass into the trap but, as the openings are upward, he cannot pass out by the same, or any similar opening in the trap and, continuing the habit of climbing upward, all of the flies that may be caught in the portion C will, eventually, pass up through the tube D into the portion A, when the portion B, C may be removed, by drawing the tube D out of the tube $D'$, and the flies disposed of from the portion A, only, without opening or disfiguring the lower portion of the trap.

I prefer that the portion B be made conical, as shown, and that the edge project over and beyond the periphery of the upper section C, as shown, so that flies that may alight upon this section will be stopped by the projecting rim, and to insure the capture of such flies I form any form of convenient opening, as indicated at $b'$, see Fig. 4, in the top of the wall of the section C just under the said projecting rim.

The lower section has a conical base that is open in the center, as at $d$ in Fig. 3, so that flies alighting under the trap will be likely to pass up through this opening into the trap.

Having thus fully described my invention, what I claim as new and desire to secure by Letters Patent of the United States, is:—

1. In a fly trap, a series of sections in a vertical tier, each upper section larger than the next lower and having an upwardly inclined connecting wall, between adjacent sections, provided with openings for the passage of flies, substantially as shown and described.

2. In a fly trap, a series of sections in vertical tier, each upper section larger than the next lower, an upwardly inclined wall connecting the same and having openings for the passage of flies, a detachable receptacle above the tier of variable sections, and means for detachably supporting the lower sections therewith.

3. In a fly trap, a series of sections placed in vertical tier, each upper section larger in diameter than the next lower, an upwardly inclined wall connecting the same and having openings for the passage of flies, the upper of said sections having a conical cover, a tube projecting upward from said cover, a detachable receptacle above said cover, and a tube in position to engage the tube on the cover and hold the sections to place, and means for supporting said receptacle and said sections suspended, substantially as and for the purpose set forth.

Signed at Holland Michigan October 5th 1906.

GILBERT T. HAAN.

In presence of:
W. J. GARROD,
M. A. SOOY.